Dec. 18, 1962  M. LEVINE ET AL  3,069,291
PRIMER COMPOSITION FOR ADHESION OF METHYL METHACRYLATE LACQUER
TO METAL, PROCESS AND ARTICLE PRODUCED THEREBY
Filed March 29, 1961

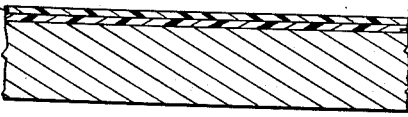

METHYL METHACRYLATE LACQUER

1) A VINYL INTERPOLYMER HAVING AN ACID NUMBER BETWEEN 40 AND 85
2) AN AMINE FORMALDEHYDE RESIN
3) AN EPOXY RESIN  AND
4) A VINYL HALIDE VINYL ESTER COPOLYMER

INVENTORS
MORRIS LEVINE and
MICHAEL YURCHESHEN
BY

Oscar L Spencer
ATTORNEY

United States Patent Office 3,069,291
Patented Dec. 18, 1962

3,069,291
PRIMER COMPOSITION FOR ADHESION OF METHYL METHACRYLATE LACQUER TO METAL, PROCESS AND ARTICLE PRODUCED THEREBY
Morris Levine, Cleveland Heights, and Michael Yurcheshen, Parma Heights, Ohio, assignors to Pittsburgh Plate Glass Company, Pittsburgh, Pa., a corporation of Pennsylvania
Filed Mar. 29, 1961, Ser. No. 99,097
8 Claims. (Cl. 117—75)

This invention relates to a multiple layer coating system for metals. More particularly, it relates to a coating system comprising a pigmented coating composition comprising (1) an interpolymer of a nitrile of an unsaturated carboxylic acid and an ethylenically unsaturated carboxylic acid and at least one other $CH_2=C<$ monomer, said interpolymer having an acid number of from about 40 to about 85, (2) a copolymer of a vinyl halide and a vinyl ester of a saturated aliphatic monocarboxylic acid, (3) a polyglycidyl ether of a polyhydric compound and (4) a urea-formaldehyde resin, said composition being used as a primer for a pigmented or unpigmented methyl methacrylate polymer lacquer top layer directly adherent to said primer.

This invention further relates to compositions for use as primers or primer-surfacers in automotive finishes and to the coating systems wherein a recoat of a methyl methacrylate lacquer is superimposed upon another coat of such lacquer.

Because methyl methacrylate lacquers composed of homopolymers and copolymers of methyl methacrylate form films having excellent gloss retention over long periods of exposure both indoors and outdoors, their use has become widespread. Because of this particular property, these methyl methacrylate lacquers have been utilized by the automotive industry as top finish coats for automobiles and similar vehicles. With the expanding use of these methyl methacrylate lacquers, however, comes many problems which have to be overcome to employ them successfully as automotive finishes or finishes for other metallic articles which are to be used outdoors.

One common problem which is encountered is the relatively poor adhesion of these methyl methacrylate lacquers to metal surfaces, which in turn results in a low level of metal protection and low level of rust inhibition of the painted metal surface. In order to overcome this shortcoming of methyl methacrylate lacquers, various primers have been developed which act as a bond between the lacquers and the metal surface. In other words, it is a requirement for the primer composition that it have very good adhesion both to the metal substrate and to the top coat lacquer.

In choosing a suitable composition to be used as a primer, it is usually no problem to find one which will have extremely good adhesion to a metal surface; however it is quite the exception to find one which will form a good, strong, adhesive bond between the primer and the top coat of methyl methacrylate lacquer composition. By their very nature, methyl methacrylate polymers have poor adhesion because they have no reactive polar groups such as are known to promote adhesion and must rely primarily on mechanical adhesion. Attempts have been made in the past to improve adhesion of the methacrylate lacquers (U.S. Patent 2,940,872) by copolymerizing minor amounts of other monomers therewith. However, the primers of the instant invention provide extremely good adhesion for any methacrylate lacquer regardless of the lacquer composition and therefore no modifications need be made with the top coat lacquers.

In many instances, especially in the automotive industry, another composition is used as a surfacer over the primer, both of which are covered by a finished to coat of lacquer or enamel. This surfacer composition is usually made up with a high pigment to binder ratio on the order of about 50 to 55 percent pigment by volume of the film, the remainder being binder or vehicle. This high pigment to binder ratio provides for a composition which may be used to fill up any discontinuities in the surface of the substrate and also provides a surface which may be sanded to a smooth and level base for the top coat. Moreover, the sanded surface, because of the minute indentations from sanding, provides much more surface area for contact between the top coat and the primer-surfacer substrate.

It has been found that the sanded or unsanded surfaces of the primer-surfacer composition are far from satisfactory even though the adhesion between the primer-surfacer coating and the top coat is improved, because the high pigment to bonder ratios produce a surface which results in poor "hold-out" of the methyl methacrylate top coat, that is, the gloss of the top coat is decreased by the minute roughness of the surfacer. It is also well-known that high pigment to binder ratio primer-surfaces lack the required protection against salt rust corrosion and also lack flexibility and resistance to chipping when abraded.

In many instances, especially in the automotive industry, it is desirable for one reason or another to retouch or recoat the acrylic lacquered top coat such as, for example, in repairing or "hiding." Many times where a second coat of an acrylic lacquer has been applied to a surface the recoat and many times the recoat and top coat manifest the undesirable phenomenon known as "crazing." While the exact cause of this crazing has not been absolutely determined, it is thought that the solvent systems of the acrylic lacquer are not able to bite into the primer compositions, especially those primers which have been cured at higher temperatures (above 275° F.) and since there is a difference in expansion and contraction obtained when the solvent system of the recoat acrylic lacquer penetrates the top coat, strains across the different points of adhesion between the primer and the top coat result in a tearing away of different portions of the top coat from one another and/or the recoat. Since it is highly desirable to retouch and recoat various acrylic lacquered surfaces, it is extremely important that such problems be overcome.

It has been discovered that the above-mentioned problems which are encountered in the use of numerous primer compositions are overcome through the use in a primer of resinous compositions comprising the above-mentioned resinous components. These resinous compositions have excellent adhesion to both the metal substrate and a top coat, which is comprised of methyl methacrylate polymer lacquer and therefore makes it possible to take full advantage of the outstanding gloss retention of these lacquers when used as a coating for metals. Since they have extremely good adhesion to the methyl methacrylate polymer lacquer composition with less pigment, the resinous compositions of the instant invention eliminate the need for a high pigment to binder ratio when used as primers and, therefore, eliminate the need for a separate composition to be used as a surfacer. Because of the lower pigment to binder ratio, there is no problem with the poor "hold-out" which is present when acrylic top coats are applied over high pigment to binder surfacers.

The resinous compositions of the instant invention have overcome the problem of recoatability and may be used with any acrylic lacquer top coat system which may at some time need to be "retouched" or recoated.

The coating system of the instant invention is depicted structurally in the accompanying drawing.

An important aspect of the instant invention is that the above-mentioned interpolymers have an acid number of at least about 40 to about 85. If the acid number drops below about 40, the retouchability characteristic is lost and if the acid number is above about 85, the coating begins to show signs of water sensitivity. It is particularly preferred that the acid number be between about 50 to about 60. To obtain these acid numbers it is preferred that the interpolymer contain in combined form from about 6.5 percent by weight to about 8.0 percent by weight of an unsaturated carboxylic acid component; however, amounts ranging as high as 11.2 percent by weight and as low as 4.5 percent by weight may be effectively employed.

The unsaturated carboxylic acid component of the interpolymer is preferably an ethylenically unsaturated monocarboxylic acid such as acrylic acid, methacrylic acid, crotonic acid, 3-butenoic acid, angelic acid, tiglic acid, or the like, although ethylenically unsaturated dicarboxylic acids such as maleic acid or fumaric acid may be also utilized if desired.

In addition to the properties of adhesion between the primer and the top coat and good recoatibility, it is also desirable to obtain such other properties as humidity resistance, corrosion resistance, flexibility and the like in primer compositions. In order to obtain good flexibility and impact resistance, it is important to interpolymerize with the unsaturated carboxylic acid at least one monomer which forms a hard homopolymer and second plasticizing type monomer which forms a relatively soft homopolymer. Among the monomers which form hard homopolymers is included methyl methacrylate, which is generally preferred for the purposes of this invention. Preferred plasticizing type monomers which may be utilized include ethyl acrylate and other lower alkyl acrylates.

In addition to the above monomers, other $CH_2=C<$ monomers can also be employed with good results. These include monoolefinic hydrocarbons such as propyl methacrylate, butyl methacrylate, methyl acrylate and butyl acrylate. The monomer which forms a hard homopolymer should be present in polymerized form in the interpolymer in amounts ranging from about 50 to about 70 percent by weight of the interpolymer and the plasticizing type monomer should be present in polymerized form in amounts ranging from about 25 percent to about 30 percent by weight of the interpolymer.

It is important to include in the interpolymer from about 10 percent to about 20 percent by weight of a unsaturated carboxylic acid such as acrylonitrile, methacrylonitrile, ethacrylonitrile and the like. The presence of the nitrile unit in the polymer tends to make the polymer more insoluble which in turn makes for better cold-cycle resistance and at the same time the presence of the nitrile groups improve the corrosion resistance of the entire coating composition.

The acid containing interpolymers may be advantageously utilized in amounts ranging from about 25 percent to about 40 percent by weight of the total resins solids. Preferably, however, the interpolymers are utilized in amounts of about 30 percent by weight of the total resins solids.

In order to obtain thermosetting properties of the resinous compositions without destroying the other desirable properties, an epoxy resin and a urea-formaldehyde resin are included therewith.

The epoxy resin which is utilized in the primer compositions of this invention may vary considerably in chemical structure. These materials, which are ordinarily polyglycidyl ethers of bisphenols, or polyether derivatives of polyhydric phenols containing epoxide groups, are formed by the reaction of bisphenols with epichlorohydrin, and range from viscous liquids to hard, brittle resins. A representative epoxy resin structure may be illustrated as follows:

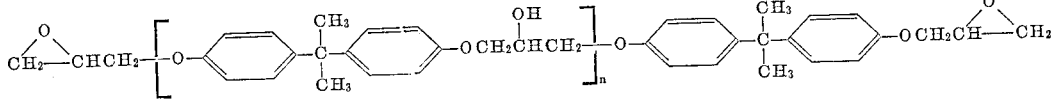

In the foregoing structure, $n$ is a number of a magnitude dependent upon the degree to which the etherification is carried. The most simple epoxy resin will be free of functional groups other than epoxide and hydroxyl groups, and will contain at least 4 carbon atoms, as illustrated by 1,2-epoxy-3,4-epoxy butane. More complex epoxy resins, such as those which result from the reaction of two or more moles of a diepoxide with one mole of a dihydric phenol, or from the reaction of three or more moles of a diepoxide with one mole of a trihydric phenol, and diepoxides or polyepoxides derived by polyhydric alcohols such as sorbitol, pentaerythritol, or polyallyl alcohols, may also be used. Among the many phenolic compounds utilized in the preparation of epoxy resins are included the following:

Bis(4-hydroxy-phenyl)2,2-propane
4,4'-dihydroxybenzophenone
Bis(4-hydroxy-phenyl)1,1-ethane
Bis(4-hydroxy-phenyl)1,1-isobutane
Bis(4-hydroxy-phenyl)2,2-butane
Bis(4-hydroxy-phenyl)2,2-propane
Bis(4-hydroxy-tertiary butyl phenyl)2,2-propane
Bis(2-hydroxy-naphthyl)methane
1,5-dihydroxy-naphthalene The epoxy component of the epoxy resins may be selected from compounds of the following group:

1-chloro-2,3-epoxy propane (epichlorohydrin)
1-chloro-2,3-epoxy butane
1-chloro-3,4-epoxy butane
2-chloro-3,4-epoxy butane
1-chloro-2-methyl-2,3-epoxy butane
1-bromo-2,3-epoxy pentane
2-chloromethyl-1,2-epoxy butane
1-bromo-4-methyl-3,4-epoxy pentane
1-bromo-4-ethyl-2,3-epoxy pentane
4-chloro-2-methyl-2,3-epoxy pentane
1-chloro-2,3-epoxy octane
1-chloro-2-methyl-2,3-epoxy octane
1-chloro-2,3-epoxy decane The epoxide resins which are liquids are particularly preferred for the use in the primer compositions of this invention. The liquid epoxide resins normally possess epoxide equivalents (grams of resin containing one gram equivalent of epoxide) below about 300. The liquid resins ordinarily will be of an average molecular weight below 500, and preferably in the range of about 350 to 450. While the liquid resins are much preferred, the solid resins can also be utilized, although compatibility problems are sometimes encountered, making production of the primer considerably more difficult than is the case with the liquid epoxide resins.

The quantity of the epoxy resin which is blended with the other resinous components to form primer compositions may be varied considerably. For example, amounts of at least about 9 percent are needed to enhance the properties of the coating compositions. On the other hand, amounts as high as 35 percent by weight of the resinous components can be also employed; the higher amounts, however, tend to over-plasticize the primer and are not as effective against crazing on recoat. Preferably, the amount of epoxy resin employed is within the range of about 20 percent to 30 percent by weight of the resinous components of the composition.

The epoxide resin functions to improve corrosion resistance and adhesion of acrylic lacquers at higher temperatures. The epoxide also acts as a stabilizer for the vinyl resin, and eliminates "filiform corrosion," a phenomenon characterized by thread-like underfilm corrosion beginning at the edge of the metallic surface and working across said surface.

As indicated above, a urea-formaldehyde resin is included in the coating composition. Such a resin is ordinarily employed in order to increase the lift resistance, that is, the resistance to the lifting by the lacquer top coat of the surfacer from the primer surface, particularly under a high-fill type surfacer. Urea-formaldehyde resins may be prepared by dispersing dimethylol urea in butanol or other alkanol which has been slightly acidified. The dispersion is heated, and both the etherification and polymerization reactions occur. It is essential that sufficient etherification take place before excessive polymerization occurs, so that the product will have good stability and solubility.

Conversely, if a high degree of etherification and relatively low polymerization occur, the resin will have low viscosity and will be slower curing. These factors are controlled by the amount and type of acidic catalyst, temperature, and the ratio of reactants. A variety of acids may be used, including phosphoric acid, formic acid, oxalic acid and phthalic acid.

In general, the ratio of combined alkanol in the final resin is from 0.5 to 1.0 mole per mole of dimethylol urea; but, of course, a considerable excess of alkanol is utilized during the resin manufacture. The water eliminated in the etherification and polymerization reaction, together with any water in the original dimethylol urea, is removed either by straight azeotropic distillation or by continuous decantation procedure. When the desired degree of etherification and polymerization is reached, as indicated by solubility and compatibility tests, the resin is neutralized and concentrated.

The amine resin should be present in the primer composition in an amount of about 1.5 percent by weight to 11.2 percent by weight and preferably from about 3 percent to about 9 percent by weight of the resinous components.

In order to obtain the optimum degree of acrylic adhesion and film strength which would be considered necessary for an operative coating system in the automotive industry, it has been found necessary to add from 25 percent to about 50 percent by weight of a vinyl resin, preferably a copolymer of a vinyl halide with a vinyl ester. The optimum amount ranges from about 33 percent by weight to about 35 percent by weight.

The most useful vinyl resins are basically copolymers consisting predominantly of a vinyl halide such as vinyl chloride, vinyl bromide or vinyl iodide, with a vinyl ester of a saturated aliphatic monocarboxylic acid, preferably of an acid containing about 1 to 6 carbon atoms. Included among the vinyl esters which may be employed are vinyl acetate, which is preferred, or vinyl propionate, vinyl butyrate, vinyl caproate, and the like.

However, in many instances copolymers of vinyl halides and vinyl esters of aliphatic monocarboxylic acid tend to be incompatible with other resinous materials except at very low levels. Accordingly, in order to improve the compatibility properties of such vinyl resins, it is desirable that the copolymer of the vinyl halide and vinyl ester be modified with a minor portion of a third component, preferably one which introduces hydroxyl (—OH) groups into the polymer structure, that is, into the copolymer chain. Hydroxyl groups are introduced into the copolymer chain by alkaline hydrolysis of at least a portion of the ester linkages in the copolymer structure.

The vinyl halide is the predominant component in the hydroxyl modified copolymers or interpolymers, ordinarily being present in an amount of about 50 percent to 95 percent by weight, while the ester of an aliphatic monocarboxylic acid is present in an amount of about 2 percent to 45 percent by weight, although these proportions can be varied if desired.

As indicated hereinabove, the hydroxyl component is present in a minor proportion, ordinarily in an amount of about 1 percent to 3 percent by weight calculated as hydroxyl. One particularly useful vinyl resin contains approximately 86 percent vinyl chloride, approximately 12 percent vinyl acetate, and approximately 2 percent hydroxyl component (approximately 6 percent when calculated as vinyl alcohol). The above vinyl resin is readily available as a commercial product, as are other vinyl halide-vinyl ester polymers which may be utilized in the primer compositions.

No special expedients are necessary in formulating the coating compositions of this invention. For example, they may be prepared simply by incorporating the resinous components in a suitable solvent system by simple agitation, or each resinous component may be dissolved in a solvent and the resulting solutions combined to form finished coating compositions.

The solvent system may be any suitable combination of organic solvents depending primarily on the method of application. One particularly useful solvent system includes toluene, ethyl alcohol, methyl ethyl ketone, isobutyl acetate, xylene, Cellosolve acetate, and acetone with the toluene, acetone and ethyl alcohol comprising the predominant components of this system. Other solvents which may be employed include terpenes, aliphatic and aromatic naphthas, and the like. Ordinarily the solvent will comprise about 45 percent to 70 percent by weight of the total coating compositions, although of course larger or smaller amounts may be utilized depending upon the solids content desired. For example, it may be desirable to formulate the primer with a relatively high solids content and then reduce it to spraying consistency prior to the time of application.

A pigment is generally included in the formulation to provide hiding power and other desirable film characteristics. Suitable pigments include carbon black (iron oxide), lithopone, magnesium silicate, chrome yellow, calcium chromate, zinc chromate, chromic phosphate, lead chromate, titanium dioxide, soap stone, and other coloring pigments as well as inert materials such as talc, clays and the like. The quantity of pigment may be as low as about 10 percent or as high as about 35 percent or higher by weight of the total composition. In certain instances the pigment may be present in amounts of about 35 percent, such as for example when grinding is to be employed. By employing a pigment such as carbon black, which in small quantities gives substantial film opacity, the film thickness can be accurately regulated, for the operator can determine the film thickness quite simply by observing the degree of surface hiding. Pigments other than carbon black can be used to impart other desirable properties.

In the automotive industry, it is particularly desirable to use a pigment in the primer composition which provides a different color than is utilized in the surfacer so that when the sanding process is carried out, the operator can readily determine simply by inspection that he has sanded through to the primer and thus avoid sanding to bare metal with the attendant recoating problems.

In addition to the pigment, other materials may be added in small quantities. Such materials include propylene oxide, anti-skinning agents, and the like. These materials contribute heat stability and package stability to the coating compositions.

The following examples illustrate in detail the preparation of the primers of this invention and their use in forming protective coatings on metallic surfaces. The examples are not intended to limit the invention, however, for there are, of course, numerous possible variations and modifications.

Example I

| | Parts by weight |
|---|---|
| Methyl methacrylate | 183.1 |
| Ethyl acrylate | 87.2 |
| Acrylonitrile | 34.8 |
| Methacrylic acid | 26.3 |
| Solvent, 75 percent aromatic hydrocarbon naphtha, boiling point 150° C. to about 170° C. (Solvesso 100), 25 percent butanol | 262.1 |
| Benzoyl peroxide | 0.2 |

The aromatic naphtha is heated in a suitable vessel to about 230° F. and a solution containing the methyl methacrylate, ethyl acrylate, acrylonitrile and methacrylic acid is added continually over a three-hour period to the vessel. After one hour, a solution containing benzoyl peroxide (0.2 part) and the aromatic naphtha, Solvesso 100 (3.3 parts), was added slowly to the reaction mixture. The reaction was then refluxed for 3 more one-hour intervals after each of which additions of benzoyl peroxide (0.2 part) and the aromatic naphtha, Solvesso 100 (3.3 parts), were made. One hour after the last addition the temperature reached 270° F. whereupon the temperature of the reaction mass was increased until 47.4 parts of aromatic naphtha, Solvesso 100, were distilled off and diacetone alcohol (264 parts) was added to the reaction mixture. The resulting product had the following properties:

| | |
|---|---|
| Viscosity (Gardner-Holdt) | $Z_3$–$Z_4$ |
| Solids (percent) | 40–41 |

Example II

| | Parts by weight |
|---|---|
| Methyl methacrylate | 183.1 |
| Ethyl acrylate | 87.2 |
| Acrylonitrile | 69.6 |
| Methacrylic acid | 26.3 |
| Solvent, 75 percent aromatic hydrocarbon naphtha, boiling point 150° C. to about 170° C. (Solvesso 100), 25 percent butanol | 262.1 |
| Benzoyl peroxide | 0.2 |

The aromatic naphtha was heated in a suitable vessel to about 230° F. and a solution containing the methyl methacrylate, ethyl acrylate, acrylonitrile and methacrylic acid was added continually over a three-hour period to the vessel. After one hour, a solution containing benzoyl peroxide (0.2 part) and the aromatic naphtha, Solvesso 100 (3.3 parts), was added slowly to the reaction mixture. The reaction was then refluexd for 3 more one-hour intervals after each of which additions of benzoyl peroxide (0.2 part) and the aromatic naphtha, Solvesso 100 (3.3 parts) were made. One hour after the last addition the temperature reached 270° F. whereupon the temperature of the reaction mass was increased until 47.4 parts of aromatic naphtha, Solvesso 100, were distilled off and diacetone alcohol (264 parts) was added to the reaction mixture. The resulting product had the following properties:

| | |
|---|---|
| Viscosity (Gardner-Holdt) | Z+ |
| Solids (percent) | 43–44 |

The primer cost compositions of the instant invention may be employed with any methyl methacrylate type lacquer. The constituents of the lacquer may be varied in kind and/or in proportion by means which are well known to the art, and those which are set forth in the following description are only representative of a wide variety of such lacquers which may be used in the coating system of the instant invention. While homopolymers of methyl methacrylate may be utilized, a particularly useful and preferred group of polymethyl methacrylate copolymers which may be employed in the preparation of top coat lacquers (Duracryl) are copolymers of methyl methacrylate with at least 10 percent by weight of an alkyl ester of an unsaturated carboxylic acid, such as acrylic acid, methacrylic acid, itaconic acid, and the like. The full and detailed description of these resinous compositions is more fully set forth in copending application, Serial No. 584,474, filed May 14, 1956. The modifying monomer, that is, the alkyl ester of an unsaturated carboxylic acid, is preferably utilized in an amount of about 10 percent to about 30 percent by weight, and the methyl methacrylate, 70 to 90 percent by weight. However, amounts as high as 50 percent by weight of the alkyl ester also may be utilized to give copolymers which impart the desired characteristics of coating compositions. The exact quantity of the alkyl ester of an unsaturated carboxylic acid employed will depend, of course, on the particular ester utilized; for example, those monomers with the most plasticizing ability, such as ethyl acrylate, butyl acrylate, octyl acrylate, lauryl methacrylate and decyloctyl methacrylate, should be used in smaller amounts. Broadly, the alkyl groups may contain from 2 to 18 carbon atoms; preferably, however, they should contain at least 8 carbon atoms.

Example III

A typical primer composition was prepared as follows:

| | Part by weight |
|---|---|
| Titanium dioxide pigment (rutile) | 2810 |
| Carbon black pigment (Mollaco black) | 260 |
| Urea-formaldehyde resin (Uformite F–240) | 201 |
| Amyl acetate | 237 |
| Aromatic high boiling naphtha (Solvesso 100) | 932 |
| Vinyl chloride resin (VAGH), 15 percent solution with a solvent consisting of ⅔ hexone and ⅓ toluene | 3390 |
| Interpolymer composition of Example I | 1015 |
| Butyl Carbitol | 191 |
| Diacetone alcohol | 498 |
| Epoxide resin (Epon 834) | 463 |

The above composition was sprayed to 2-mil thickness onto phosphated steel panels which were baked for 45 minutes at 275° F., after which a black automotive type lacquer (Duracryl, product of Pittsburgh Plate Glass Company) was applied (sprayed) as a top coat of 4 mil thickness and baked at 160° F. for 20 minutes.

Another panel was coated with a second recoat of the same black automotive type lacquer (Duracryl). The recoated panel was then baked at 225° F. for 30 minutes; the surface of the recoat was entirely continuous with no cracking or crazing.

Example IV

Another primer composition was prepared as follows:

| | Parts by weight |
|---|---|
| Blanc fix pigment (chemically precipitated barium sulfate) | 1405 |
| Magnesium silicate pigment (talc) | 140 |
| Lamp black pigment (Mollaco black) | 260 |
| Urea-formaldehyde resin (Uformite F–240) | 70 |
| Amyl acetate | 237 |
| Aromatic high boiling naphtha (Solvesso 100) | 932 |
| Vinyl chloride resin (VAGH), 15 percent solution with a solvent consisting of ⅔ hexone and ⅓ toluene | 3390 |
| Interpolymer composition of Example I | 1015 |
| Butyl Carbitol | 191 |
| Diacetone alcohol | 498 |
| Epoxy resin (Epon 834) | 463 |

The above composition was sprayed to 2 mil thickness onto phosphated steel panels which were baked for 45 minutes at 275° F., after which an automotive type lacquer (Duracryl, product of Pittsburgh Plate Glass Company) was applied (sprayed) as a top coat of 4 mil thickness and baked at 160° F. for 20 minutes.

Another panel was subjected to a standard cold cycle test which is well known for the testing of automotive coating systems for 20 cycles without failure. As in Example II, another panel was coated with a second recoat of the same black automotive type Duracryl lacquer. The recoated panel was again baked at 225° F. for 30 minutes; the surface of the recoat was entirely continuous with no cracking or crazing.

The acrylic adhesion was tested in three different ways: (1) by the "cross hatch" method; (2) the "knife" method; and (3) the "tape" method.

The cross hatch method comprises cutting a series of parallel lines about 1/16 inch apart in the coating surface and another series of parallel lines over the same area but perpendicular to the first set of parallel lines. The amount of chipping observed is the measure of the adhesion.

The knife method comprises gouging a groove into the surface of the coating with the flat tip of the knife and observing the manner in which the coating is removed. If the adhesion is poor, the coating will break freely away from the substrate.

The tape method comprises cutting an "X" in the surface of the coating with a knife, rubbing a pressure-sensitive tape against the "X" surface and removing the said tape in a rapid motion almost parallel to the plane of surface. The amount of coating which comes off with the tape is also a measure of the adhesion of the coating. The panels coated with the baked resin of Examples III and IV were found to have extremely good adhesion.

In order to simulate extreme weather conditions which may affect an automotive finish, the automotive industry has recently set up what is called the standard "cold cycle test" for automotive finishes. The test is carried out as follows:

Phosphatized steel panels are coated with the primer compositions of Examples III and IV having a thickness of about 3 mils, and baked for 45 minutes at 275° F. The panel is then coated with the top coat acrylic lacquer (4 mil thickness) and baked for 20 minutes at 160° F. After the panels have cooled, they are placed in an atmosphere having 100 percent relative humidity at a temperature of 100° F. and subjected to this environment for 24 hours. They are then immediately chilled to —10° F. in a cold box and held for 20 hours, after which they are allowed to warm one hour at room temperature and observed for cracks. After 3 more hours the above cycle is repeated. In order to be acceptable for automotive use the coating system must be able to withstand at least 15 cycles without failure.

Interpolymers comprising alkyl methacrylates other than methyl methacrylate, such as propyl methacrylate, ethyl methacrylate and butyl methacrylate may be used as may acrylates other than ethyl acrylate such as methyl acrylate and butyl acrylate.

This application is a continuation-in-part of application Serial Number 856,966 filed December 3, 1959.

Although specific examples of the invention have been set forth hereinabove, it is not intended that the invention be limited solely thereto, but to include all of the variations and modifications falling within the scope of the appended claims.

We claim:

1. A metal article having a hard adherent crack-resistant multiple layer coating comprising a layer of primer and a superimposed layer of a methyl methacrylate lacquer in adherent contact therewith, said primer being a layer of a cured coating composition comprising from about 25 percent to about 40 percent by weight of (1) an interpolymer of from about 10 percent to about 20 percent by weight of a nitrile of an unsaturated carboxylic acid, 25 percent to about 35 percent by weight of a lower alkyl acrylate, 53 percent by weight to about 60 percent by weight of a lower alkyl methacrylate and from about 4.5 percent by weight to about 11.2 percent by weight of an ethylenically unsaturated carboxylic acid, from about 1.5 percent by weight to 11.2 percent by weight of (2) a urea-formaldehyde resin, from about 9 percent by weight to about 35 percent by weight of (3) a polyglycidyl ether of a polyhydric compound and from about 25 percent to about 50 percent by weight of (4) a copolymer of a vinyl halide and a vinyl ester of a saturated aliphatic monocarboxylic acid.

2. A metal article having a hard adherent crack-resistant multiple layer coating comprising a layer of primer and a superimposed layer of a methyl methacrylate lacquer in adherent contact therewith, said primer being a layer of a cured coating composition comprising from about 25 percent to about 40 percent of (1) an interpolymer of from about 10 percent to about 20 percent by weight of a nitrile of an unsaturated carboxylic acid, from about 25 percent to about 30 percent by weight of an alkyl acrylate, from about 53 percent by weight to about 60 percent by weight of a lower alkyl methacrylate and from about 6.5 percent by weight to about 8.0 percent by weight of an ethylenically unsaturated carboxylic acid, from about 25 percent by weight to about 50 percent by weight of (2) a copolymer of a vinyl halide and a vinyl ester of a saturated aliphatic monocarboxylic acid and from about 20 percent by weight to about 30 percent by weight of (3) a polyglycidyl ether of a polyhydric compound and from about 3 percent by weight to about 9 percent by weight of (4) a urea-formaldehyde resin.

3. A metal article having a hard adherent crack-resistant multiple layer coating comprising a layer of primer and a superimposed layer of a methyl methacrylate lacquer in adherent contact therewith, said primer being a layer of a cured coating composition comprising from about 25 percent by weight to about 40 percent by weight of (1) an interpolymer of from about 10 percent to about 20 percent by weight acrylonitrile, from about 25 percent to about 30 percent by weight of ethyl acrylate, from about 53 percent to about 60 percent methyl methacrylate and from about 6.5 percent to about 8.0 percent by weight of methacrylic acid, from about 1.5 percent by weight to about 12 percent by weight of (2) a urea-formaldehyde resin, from about 20 percent by weight to about 30 percent by weight of (3) a polyglycidyl ether of bis(4-hydroxy-phenyl)2,2-propane and (4) from about 25 percent by weight to about 50 percent by weight of a copolymer of vinyl chloride and vinyl acetate.

4. The metal article of claim 3 wherein the said interpolymer has an acid number ranging from about 40 to about 85 based on the resins solids.

5. A method comprising sequentially coating a metal surface with a resinous composition comprising (1) an interpolymer of from about 10 percent to about 20 percent by weight of a nitrile of an unsaturated carboxylic acid, 25 percent to about 35 percent by weight of a lower alkyl acrylate, 53 percent by weight to about 60 percent by weight of a lower alkyl methacrylate and from about 4.5 percent by weight to about 11.2 percent by weight of an ethylenically unsaturated carboxylic acid, from about 1.5 percent by weight to 11.2 percent by weight of (2) a urea-formaldehyde resin, from about 9 percent by weight to about 35 percent by weight of (3) a polyglycidyl ether of a polyhydric compound and from about 25 percent to about 50 percent by weight of (4) a copolymer of a vinyl halide and a vinyl ester of a saturated aliphatic monocarboxylic acid, baking said coated surface to effect curing and coating said coated surface with a first coat of an acrylic lacquer.

6. The method of claim 5 wherein the said first coat of an acrylic lacquer is baked at a temperature of at least about 160° F. and is subsequently coated with another coat of an acrylic lacquer.

7. A resinous composition consisting essentially of from about 25 percent to about 40 percent of (1) an interpolymer of from about 10 percent to about 20 percent by weight of a nitrile of an unsaturated carboxylic acid, from about 25 percent to about 30 percent by weight of an alkyl acrylate, from about 53 percent by weight to about 60 percent by weight of a lower alkyl methacrylate and from about 6.5 percent by weight to about 8.0 percent by weight of an ethylenically unsaturated carboxylic acid, from about 25 percent by weight to about 50 percent by weight of (2) a copolymer of a vinyl halide and a vinyl ester of a saturated aliphatic monocarboxylic acid and from about 17 percent by weight to about 30 percent by weight of (3) a polyglycidyl ether of a polyhydric compound and from about 3 percent by weight to about 9 percent by weight of (4) a urea-formaldehyde resin.

8. A resinous composition consisting essentially of about 30 percent by weight of (1) an interpolymer of from about 10 percent to about 20 percent by weight of acrylonitrile, from about 25 percent to about 30 percent by weight of ethyl acrylate, from about 53 percent by weight to about 60 percent by weight methyl methacrylate and from 6.5 percent by weight to 8 percent by weight of methacrylic acid and from about 3 percent to about 9 percent by weight of (2) a urea-formaldehyde resin, from about 20 percent by weight to about 30 percent by weight of (3) a polyglycidyl ether of bis(4-hydroxy)-phenyl-2,2-propane and about 33 percent to about 35 percent by weight of (4) a copolymer consisting essentially of from about 86 percent by weight of vinyl chloride and about 12 percent by weight vinyl acetate.

References Cited in the file of this patent

UNITED STATES PATENTS

| | | |
|---|---|---|
| 2,873,211 | Roeser | Feb. 10, 1959 |
| 2,889,236 | Hahn | June 2, 1959 |
| 2,892,808 | Shafer | June 30, 1959 |
| 3,011,909 | Hart et al. | Dec. 5, 1961 |